W. McCLEARY.
ANTISKID DEVICE.
APPLICATION FILED SEPT. 3, 1915.
1,218,430.
Patented Mar. 6, 1917.
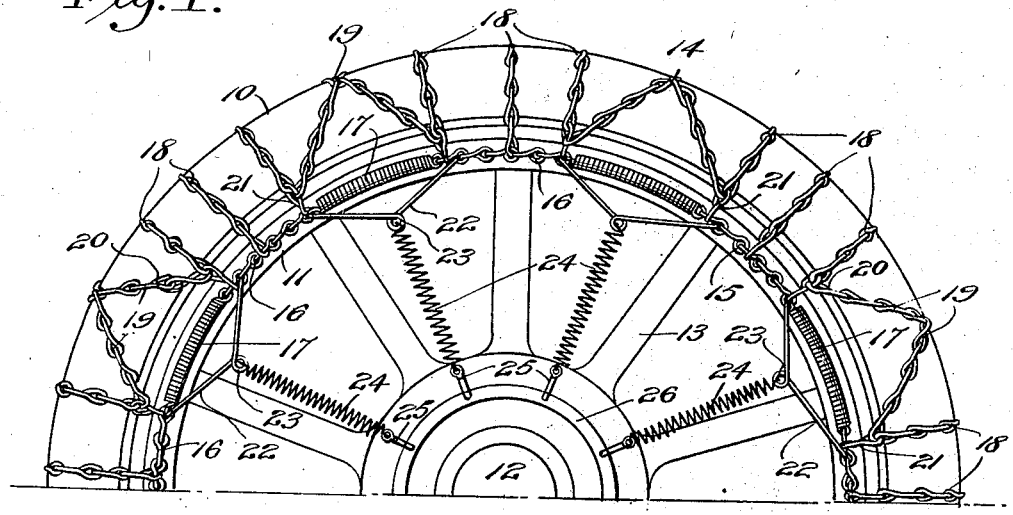
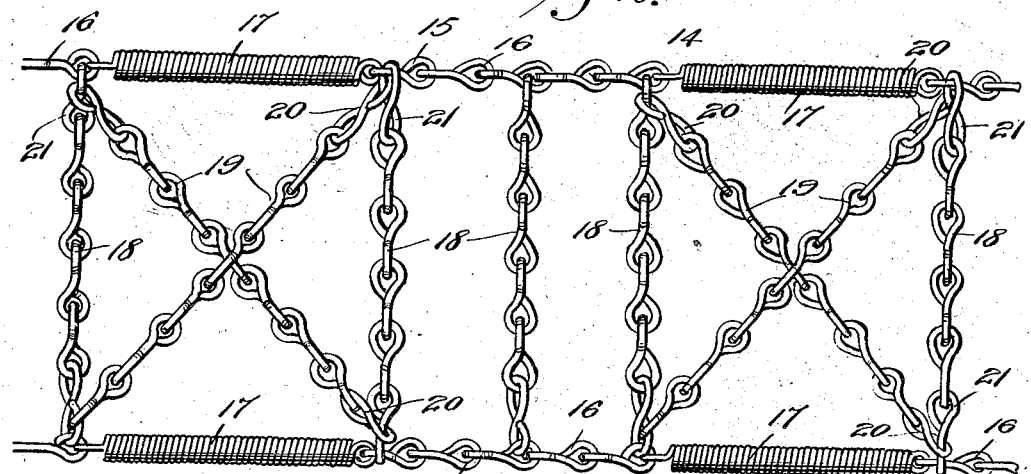
Witness
N. S. McDowell
Inventor
William McCleary
By Victor J. Evans
Attorney

UNITED STATES PATENT OFFICE.

WILLIAM McCLEARY, OF WILMINGTON, DELAWARE.

ANTISKID DEVICE.

1,218,430.  Specification of Letters Patent.  Patented Mar. 6, 1917.

Application filed September 3, 1915.  Serial No. 48,825.

*To all whom it may concern:*

Be it known that I, WILLIAM McCLEARY, a citizen of the United States, residing at Wilmington, in the county of Newcastle and State of Delaware, have invented new and useful Improvements in Antiskid Devices, of which the following is a specification.

The invention relates to anti-skid chains for use in conjunction with the pneumatic tire of automobile wheels, and an object thereof is to provide an improved chain of this character adapted to prevent skidding or lateral swerving on part of a vehicle equipped with said chains and to assist in establishing a better engagement between said tires and a coöperating road-bed.

Further objects of the invention reside in a chain of the above type capable of being expeditiously and securely associated with a tire and normally held in operative position by the tension of coiled springs forcing the chain into close frictional engagement with the outer periphery of the said tire.

Still further objects are to provide an anti-skid chain for automobiles with a peculiarly designed road engaging tread, comprising spaced intersecting diagonally extending chains, designed to prevent lateral movement of a road wheel, and transversely extending chains, interposed between the several sections of the diagonally extending chains, particularly adapted to facilitate in creating a better contact between said road-wheel and the road-bed therefor, aiding in the general forward or rearward movement of a vehicle.

In the accompanying drawing, which illustrates one of the various possible embodiments of the invention, Figure 1 is a side elevation of a portion of a vehicle wheel illustrating the application of the present invention;

Fig. 2 is a fragmentary plan view of the chain structure illustrated on an enlarged scale, Fig. 3 is a detail view of one of the spring attaching clips, and Fig. 4 is a similar view of one of the inner clips and coöperating ring.

Referring to the drawings, which illustrate the preferred form of the invention, the numeral 10 designates the usual type of pneumatic or other resilient tire, the latter being positioned upon the rim of a wheel 11 formed with the usual hub 12 and radiating spokes 13. Positioned upon the tire 10, in a manner presently described is an improved form of anti-skid chain device, designated in its entirety by the numeral 14.

The anti-skid chain 14 embodies side chains 15, formed of relatively short sections 16 which are yieldably connected by coiled contractile springs 17, in order that said chains 15, as a whole, present an elastic belt, as will be obvious.

Connected to the sections 16 of the chains 15 are transversely extending tread chains 18 which serve to unite the side chains 15 together. Positioned between the chains 18 and located adjacent the springs 17 are diagonally disposed intersecting chains 19, which have the end links 20 thereof joined to the outer links 21 of the cross chains 18, said chains 18 and 19 forming the tread portion of the device.

In order to firmly secure the chains 15 upon the tire 10 clips 22 are connected with the links of the chain 15 contiguous to the springs 17 and are provided with eyes 23 for the reception of one end of coiled springs 24 which have the inner end thereof connected by means of spring clips 25 to annular rings 26, surrounding the hub 12.

In operation the chain 14 is positioned upon the tire 10 and is securely retained thereon by the tension exerted downwardly by the coiled springs 24, the side springs 17 also assist in maintaining a close relation between the tread portions of the chain 14 and the tire 10 and prevent said chain from creeping around the outer periphery of said tire.

One of the main features of the device resides in the peculiar arrangement of the tread chains 19 which prevent skidding or lateral displacement on part of the tire 10 and the transversely disposed chains 18 so arranged as to permit the tire to secure a driving grip upon the road-bed, a feature particularly desirable in muddy or sandy roads.

I claim:—

In a device of the class described, in combination a hub, a rim, a tire on said rim, a circumferentially spaced apart series of coiled springs arranged at each side of the hub, a series of clips each formed of a coiled V-shaped single metallic strip bent so as to provide a central eye and two arms extending in opposite directions from the eye, integral hooks formed upon opposite ends of each clip and curving around toward the inner sides of said arms, said coiled springs being secured to the eyes of said clips at one end, means for securing the opposite ends of said springs upon said hub, a series of chain sections engaging the hooks of said clips, and a series of chain sections extending across said tire and connecting the first named chain sections.

In testimony whereof I affix my signature.

WILLIAM McCLEARY.